United States Patent
Tsuboi et al.

(10) Patent No.: US 6,366,700 B1
(45) Date of Patent: Apr. 2, 2002

(54) IMAGE DATA DECODER FOR STILL AND MOVING PICTURE DATA

(75) Inventors: Eiji Tsuboi; Kazuyosi Aoyama; Taizou Takahashi, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/277,634

(22) Filed: Mar. 26, 1999

(30) Foreign Application Priority Data

Mar. 27, 1998 (JP) .......................................... 10-081490

(51) Int. Cl.[7] ................................................ G06K 9/36
(52) U.S. Cl. .................. 382/236; 382/233; 375/240.25; 386/109
(58) Field of Search ................................ 382/232–233, 382/236, 239; 348/565, 699–700; 375/240.01, 240.02, 240.13–240.18, 240.25, 240.27; 386/109, 68–69

(56) References Cited

U.S. PATENT DOCUMENTS

| | | | | |
|---|---|---|---|---|
| 4,924,311 A | * | 5/1990 | Ohki et al. ............ | 375/240.18 |
| 5,148,270 A | * | 9/1992 | Someya ................. | 375/240.25 |
| 5,363,139 A | * | 11/1994 | Keith .................... | 375/240.12 |
| 5,457,675 A | * | 10/1995 | Suzuki et al. ................. | 386/69 |
| 5,880,786 A | * | 3/1999 | Oku et al. ............. | 375/240.15 |

FOREIGN PATENT DOCUMENTS

EP 0674448 9/1995

* cited by examiner

*Primary Examiner*—Leo Boudreau
*Assistant Examiner*—Ishrat Sherali
(74) *Attorney, Agent, or Firm*—Dickstein Shapiro Morin & Oshinsky LLP (57) ABSTRACT

An image data decoder decodes moving picture data and still MPEG or JPEG data alternately with each other. The decoder decodes the moving picture data without an interval between decoding adjacent macro block lines each including sixteen lines, thereby increasing the time interval between adjacent picture frames. The decoder decodes several slices or several macro block lines in the still MPEG data for the increased time interval without an additional data decoder.

7 Claims, 8 Drawing Sheets

IMAGE DATA DECODER FOR STILL AND MOVING PICTURE DATA

BACKGROUND OF THE INVENTION (a) Field of the Invention

The present invention relates to an image data decoder for still and moving picture data and, more particularly, to an image data decoder capable of decoding compressed moving picture data and the compressed still picture data with a simplified circuit structure.

(b) Description of the Related Art

Image data decoders are known which is capable of outputting moving picture data to a display unit in real time while decoding compressed moving picture data input therein. Some of these image data decoders have a function for decoding a single macro block line data, or data displayed on sixteen scanning lines, within sixteen line-times in a single image frame. The term "line-time" as used herein means a time length required for forwarding or receiving data for a single scanning line.

Figure 1:
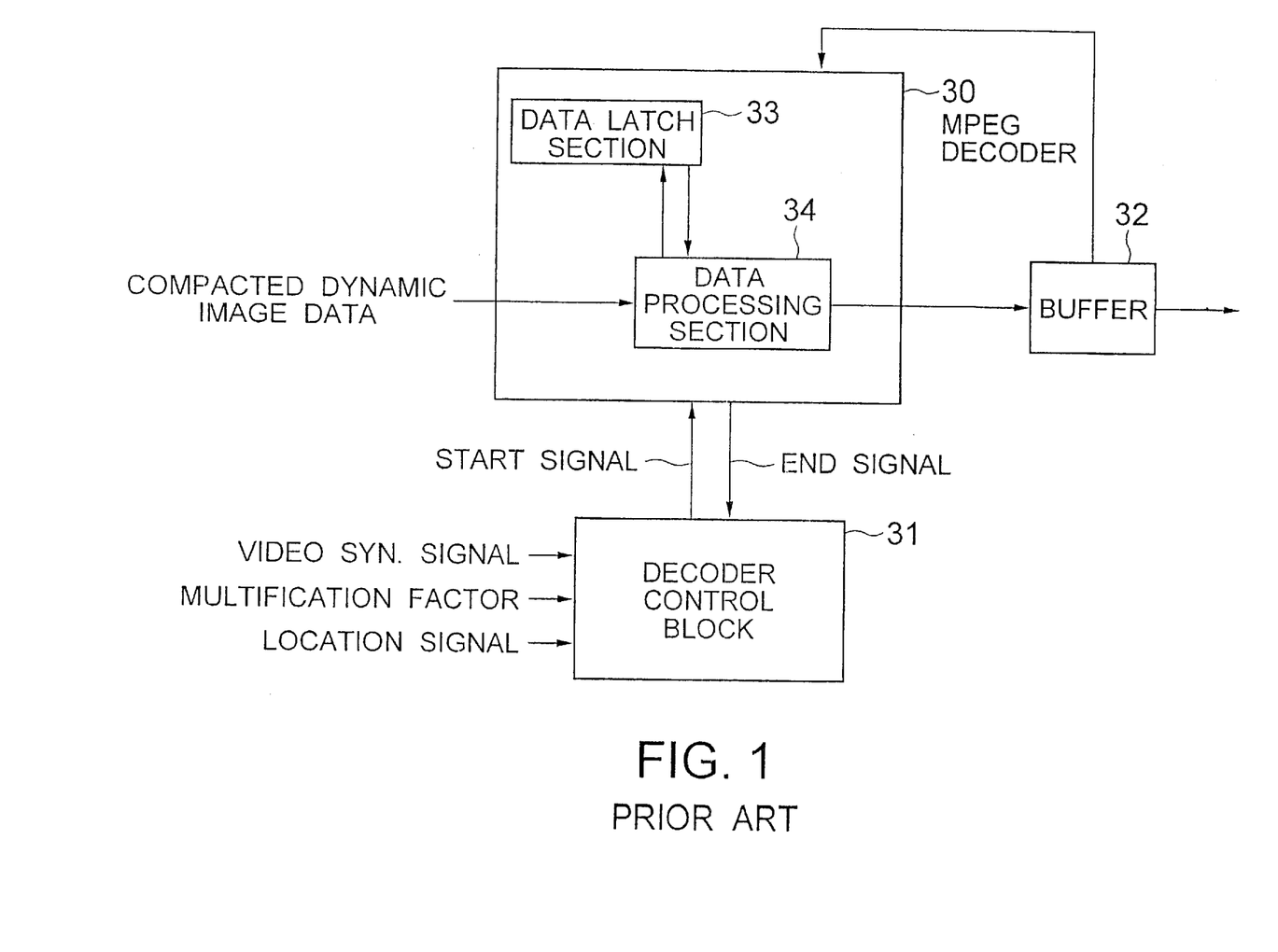
FIG. 1 is a block diagram of a conventional image data decoder.

FIG. 1 schematically shows a conventional image data decoder of the type as mentioned above. The moving picture decoder includes a MPEG (Moving Picture Experts Group) decoder 30 for decoding compressed moving picture data by using a MPEG scheme generally used as an international standard, a decoder control block 31 for controlling the operation of the MPEG decoder 30, and a buffer for outputting the decoded data while temporarily storing the decoded data. The MPEG decoder 30 includes a data latch section 33 and a data processing section 34.

In general, each picture layer constituting a single frame includes a plurality of pixel data and parameters called "header" attached to each layer constituting the pixel data. The data latch section 33 latches specified parameters from among the parameters included in each layer of the compressed image data input to the MPEG decoder 30. The data processing section 34 forwards the specified parameters to the data latch section 33, starts for decoding the compressed image data input therein for a single frame picture after the decoder control block 31 delivers a start signal to the MPEG decoder 30 for indicating the decode of the moving picture data, whereby the decoded moving picture data are delivered to the buffer 32. The buffer 32 receives the decoded moving picture data from the data processing section 34 to deliver output image data to a display unit not shown.

The decoder control block 31 receives a video synchronizing signal for representing an absolute location on the screen of the display unit, which iterates digits between 0 and 524 in a NTSC standard, a multification factor for effecting enlargement or reduction of the image on the screen based thereon, and location data for specifying the image location on the screen. The decoder control block 31 delivers a decode start signal to the MPEG decoder 30 for indicating the decode of the moving picture data based on the video synchronizing signal, whereas the MPEG decoder 30 delivers a notification signal for notifying the end of the decode after the decode of the moving picture data is finished by the MPEG decoder 30.

The data storage section 33 latches the specified parameters from the moving picture data through the data processing section 34, and the decoder control block 31 receives the multification data and the image location data to deliver the decode start signal to the MPEG decoder 30 in synchrony with the video synchronizing signal. The MPEG decoder 30 responds to the decode start signal to start for decoding the input frame picture corresponding to the parameters latched by the data latch section 33, and delivers the decoded moving picture data to the buffer 32. The buffer 32 outputs the received moving picture data to the display unit while temporarily storing the same.

Figure 2:
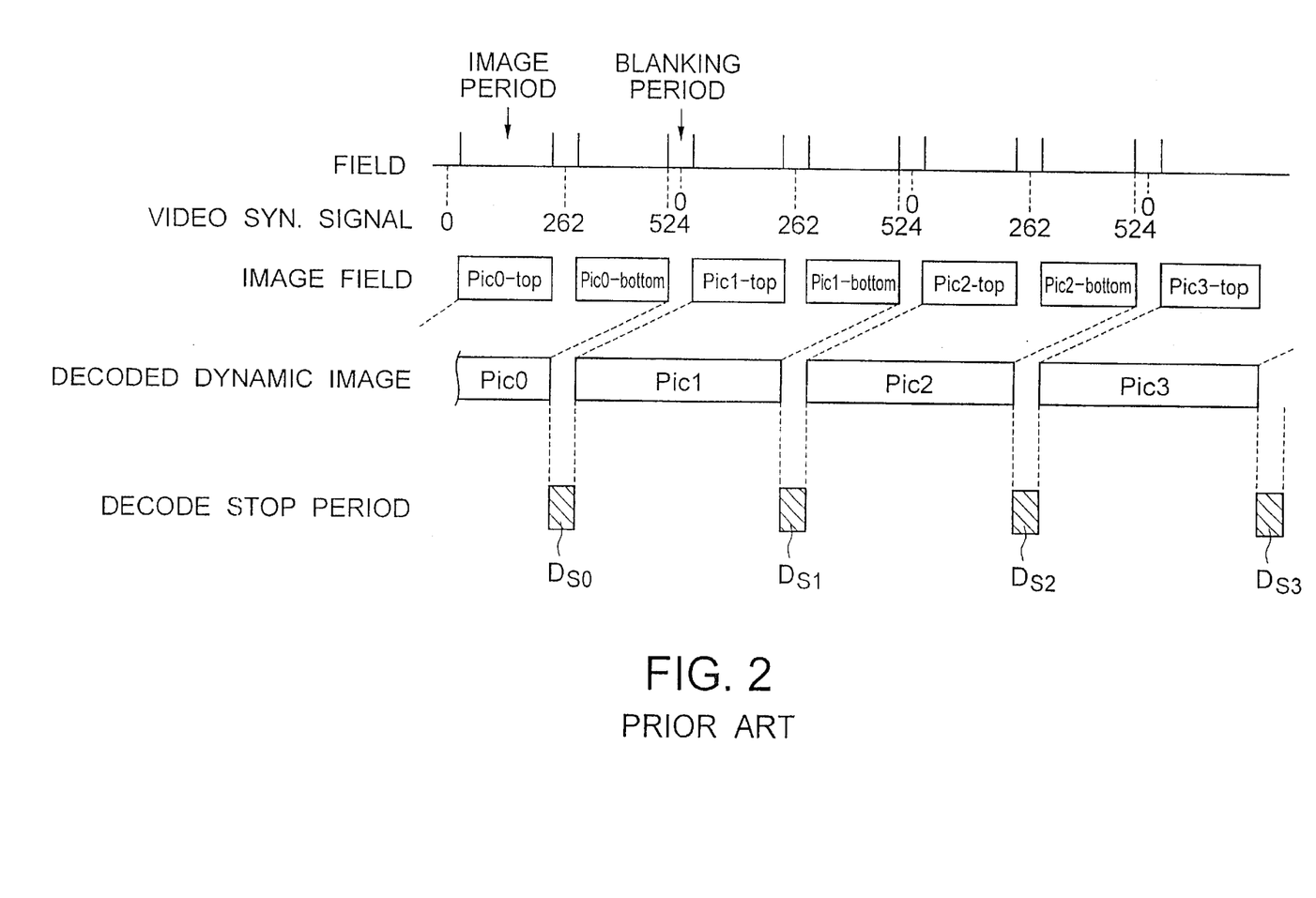
FIG. 2 is a timing chart of the image data decoder of FIG. 1.

FIG. 2 shows a timing chart for decoding operation by the conventional MPEG decoder of FIG. 1. Fields which constitute a single frame include an odd-numbered field and an even-numbered field occurring alternately with each other, between which a blanking period is provided. The compressed moving picture data includes a series of frame pictures pic0 to pic3, which sandwich between each two of them a decode stop period Ds0 to Ds3. The image data pic0-top to pic3-top for the odd-numbered fields and the image data pic0-bottom to pic3-bottom for the even-numbered fields are delivered corresponding to the frame pictures pic0 to pic3 as the decoded moving picture data.

In the conventional MPEG decoder, if still picture data, such as a TV program list, is to be displayed on a display unit together with the moving picture data, an additional decoder must be provided for decoding the still picture data separately from the MPEG decoder decoding the moving picture data. The additional decoder increases the circuit scale and the chip size of the MPEG decoder, however. Thus, an image data decoder is desired wherein the decode of the still picture does not substantially increases the circuit scale and the chip size of the image data decoder.

SUMMARY OF THE INVENTION

In view of the above, it is an object of the present invention to provide an image data decoder which is capable of decoding still picture data together with moving picture data for enabling display of a still picture and a moving picture on a single display unit, substantially without increasing the circuit scale and the chip size of the MPEG decoder.

The present invention provides a MPEG decoder comprising: a decoding block including a data processing section for decoding moving picture data and still picture data alternately with each other, the moving picture data including a plurality of frame pictures each having a frame period, each adjacent two of the frame pictures being supplied with a first time space therebetween: and a decoder control block including a calculation section for calculating a first time length necessary for said decoding block to decode data for each of the frame pictures and calculating a second time space by subtracting the first time length from the frame period, and a control section for controlling said decoding block to decode the moving picture data for the first time length and to decode the still picture data for a sum of the first time space and the second time space.

In accordance with the image data decoder of the present invention, the single data processing section decodes the moving picture data and the still picture data without an additional processor, thereby reducing the circuit scale of the decoder for decoding moving picture data and the still picture data. If the moving picture data is for TV broadcasting, the still picture data may be preferably for a program list of the TV broadcasting.

The inventors noticed the time length of the time space between frame periods in the conventional image data decoder and the time length of the frame period, and considered that the combination of short time spaces between macro block lines in the frame period and the time space between the frame periods would provide a time length sufficient for decoding at least a part of still picture data.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals.

Figure 3:
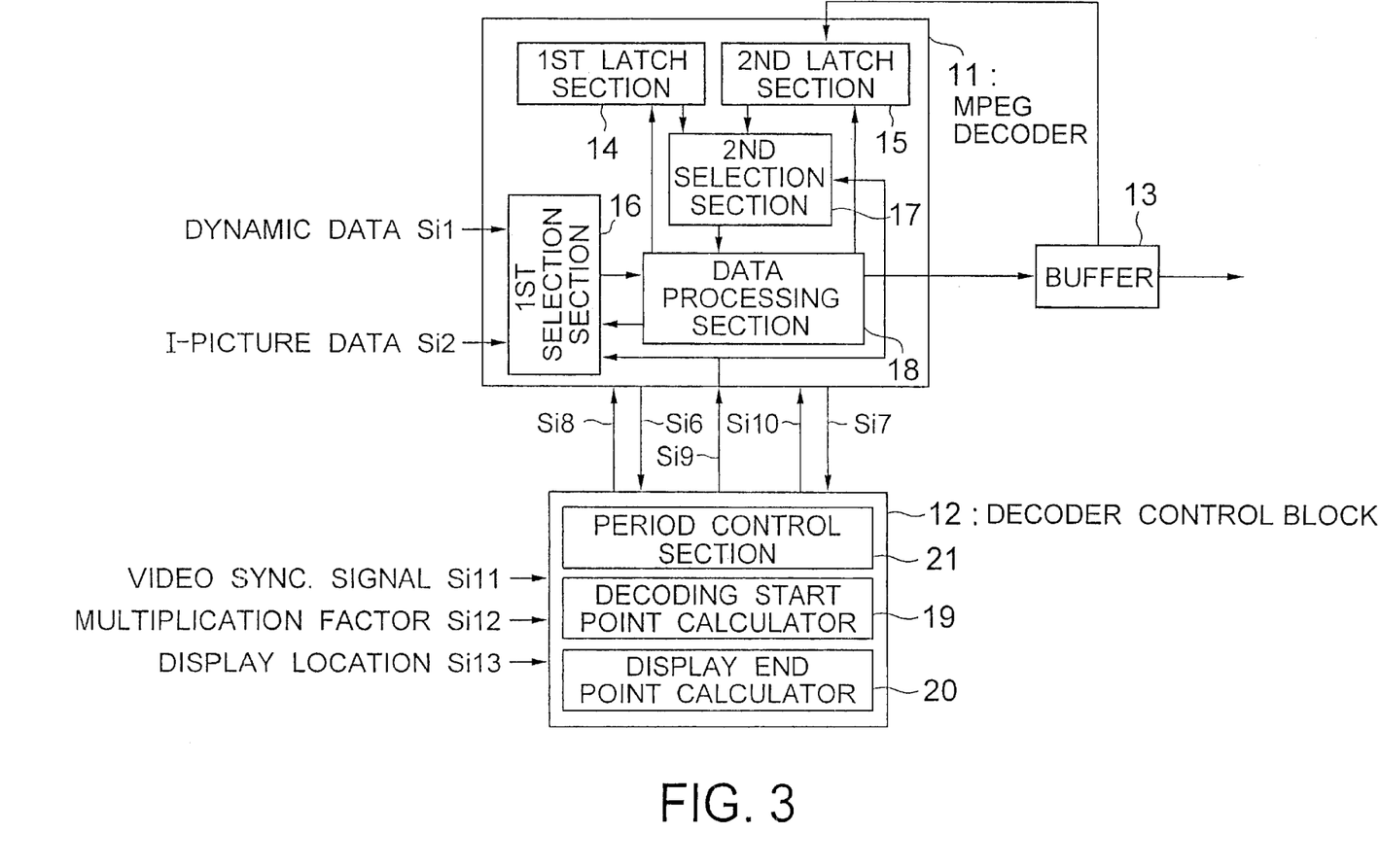
FIG. 3 is a block diagram of a image data decoder according to a first embodiment of present invention.

Referring to FIG. 3, an image data decoder according to a first embodiment of the present invention includes a MPEG decoder 11, a decoder control block 12 and a buffer 13. The image data decoder of the present embodiment is adapted to a MPEG-2 scheme wherein the decoder is not limited to any specific field for application and specific coding system.

The MPEG decoder 11 includes a first data latch section 14, a second data latch section 15, a first selection section 16, a second selection section 17 and a data processing section 18. The first data latch section 14 latches parameters (headers) attached to the layers above the picture layer of the compressed moving picture data among the parameters attached to all the layers. In this configuration, the data for the layers higher than the picture layer are secured by latching those parameters, to decode the moving picture data picture frame by picture frame.

The second latch section 15 latches parameters attached to the layers above the slice layer of the compressed I-picture among the parameters attached to all the layers. In this configuration, the data for the layers higher than the slice layer are secured by latching the parameters, thereby latching the I-picture data slice by slice between adjacent two picture frames of the moving picture data.

The first selection section 16 selects either the compressed moving picture data Si1 or the compressed I-picture data Si2 of MPEG standard, and delivers the selected data to the data processing section 18. The second selection section 17 selects either the data latched by the first data latch section 14 or the data latched by the second latch section 15, and delivers the selected data to the data processing section 18.

The data processing section 18 delivers the parameters in the compressed moving picture data Si1 to the first data latch section 14, and also delivers the parameters in the compressed I-picture data Si2 to the second data latch section 15. The data processing section 18 decodes the compressed moving picture data Si1 within a moving picture data decoding period (MPEG period) determined by the period control section 21, described later, and decodes the compressed I-picture data Si2 within a still picture data decoding period (I-picture period) obtained by adding a sum of the time spaces calculated in a frame period to the decoding stop period disposed between the adjacent frame periods of the moving picture data.

The buffer 13 stores receives decoded image data from the data processing section 18 and delivers the same as output image data while temporarily storing the same. The storage capacity of the buffer 13 in the present embodiment is about 16 M-bite which corresponds to at least two frames of the moving picture data, preferably three frames of the moving picture data. The capacity is determined in consideration that the I-picture data and the P-picture (predictive picture) data within a MPEG period should be stored, and a frame picture is displayed by the buffer 13 while decoding and storing another frame picture.

The MPEG decoder 11 delivers to the decoder control section 12 a first notification signal Si6 for notifying an end of decoding moving picture data and a second notification signal Si7 for notifying an end of decoding I-picture data. The first notification signal Si6 is generated each time the decoding of a single picture of the moving picture data is completed, whereas the second notification signal Si7 is generated each time the decoding of a single slice of the I-picture data is completed. The decoder control block 12 delivers to the MPEG decoder 18 a first start signal for indicating a start of decoding moving picture data, a state signal for indicating the state of decoding the moving picture data or the I-picture image data, and a second start signal for indicating a start of decoding the I-picture image data.

The decoder control block 12 includes a period control section 21, a decoding start point calculator 19 for calculating the start point of decoding the moving picture data, and a display end point calculator 20 for calculating the end point of displaying the moving picture data. The decoder control block 12 receives a video synchronizing signal Si11 for representing absolute points on the display screen, a multiplication factor data Si12 for representing a multiplication factor for enlargement or reduction of an image to be displayed, and a location data Si13 for indicating the locations for the image data on the display screen.

The decoder control block 12 delivers a decoding start signal Si8 for decoding the moving picture data after the number specified in the video synchronizing signal exceeds the decoding start point of the moving picture signal calculated by the decoding start point calculator 19. The MPEG decoder 11 delivers an end notification signal Si6 for notifying the end of decoding the moving picture data when the decoding for a single frame picture of the moving picture data is completed after receipt of the decoding start signal Si8 for the moving picture data. By iterating these operations, decoding is performed in succession. The decoder control block 12 delivers "0" for the state signal Si9 during decoding the moving picture data, and delivers "1" for the state signal Si9 during decoding the I-picture image data, thereby notifying the state of decoding the moving picture or the I-picture image data.

The period control section 21 calculates a time length necessary for decoding an amount of image data corresponding to a specified number of scanning lines, or macro block line, and calculates sum of time spaces in a single frame picture by subtracting the sum of the time lengths each necessary for decoding the specified number of scanning lines, i.e., macro block line, from the time length of the frame period. The period control section 21 then controls the data processing section 18 to start for decoding a corresponding frame picture of the moving picture data from the decoding start point calculated by the decoding start point calculator 19.

The display end point calculator 20 calculates the end point for displaying a single frame picture of the moving picture data in consideration of the multiplication factor input thereto.

The decoding start point calculator 19 calculates the decoding start point for decoding a single frame picture of the moving picture data based on the display end point calculated by the end point calculator 20 and the sum of time spaces as described above. That is, since the decoding for a single picture frame is finished before the display end point, the decoding start point is calculated as the time instant at which the sum of decoding stop period between frames of the moving picture data and the time space sum calculated by the period control section 21 is elapsed since the display end point.

An example for calculating the decoding start point will be shown herein for the case that input image data including 720×480 pixel data are displayed with a multiplication factor of ½, with the display start point set at 10. In a NTSC standard, a single frame includes 525 scanning lines, which are consecutively numbered from 0th to 524th by the video synchronizing signal. It is assumed that the data displayed in an odd-numbered field and the data displayed in the even-numbered fields are displayed on 22nd to 261st and 285th to 524th, respectively, for the numbering of the video synchronizing signals.

In the case as described above, since the multiplication factor is ½ and the display start point is 10, the display end point is calculated as follows:

22+10+240×½=152 for an odd-numbered field, and

285+10+240×½=415 for an even-numbered field. The decoding must be completed at the display end point of the odd-numbered field of the moving picture data. Thus, 152 for the odd-numbered field of the moving picture data is effective.

On the other hand, the decoding stop period in terms of line-times between adjacent frames of the moving picture data is calculated as follows:

525−16×30=45 wherein 525 is a time length in terms of line-times for a single frame period, 16 is the number of lines included in a single macro block line, and 30 is the number of macro block lines in a picture frame.

If 13 line-times is set as a time length necessary for decoding a single macro block line of B-picture (bi-directionally predictive picture) in the period control section, then the period control section calculates the total of time spaces within a picture period as follows:

480−13×30=90 (line-times)

wherein 480 is a total number of lines on the screen. Thus, the start point of decoding the moving picture data is calculated from the number of the video synchronizing signal as follows:

152+45+90=287.

Then, the time length required for decoding the I-picture data is practically calculated in terms of the number of frame periods, assuming that the I-picture data includes 720×480 pixels. In this case, it is also assumed that the image data decoder has an ability of decoding the data of a single macro block line, i.e., 16 scanning lines in a time length of 13 line-times. Specifically, the data that the image data decoder can decode the data for 16 lines within 13 line-times without fail is determined and set beforehand in the period control section. In addition, it is assumed that a single frame picture corresponds to 525 line-times, i.e., 1/30 seconds, and includes 30 macro block lines. Thus, the time length for decoding the I-picture data between adjacent frame periods is calculated as follows:

525−13×30=135 (line-times).

By calculating 135/13=10.3, a time length of 135 line-times corresponds to a time length for decoding about 10 macro block lines of the moving picture data. Accordingly, decoding of the I-picture data can be completed in a time length corresponding to three picture frames of the moving picture data because a single frame picture includes 30 macro block line (30/10=3). The three picture frames corresponds to 1/10 second by calculating:

(1/30)×3=1/10.

Figure 4:
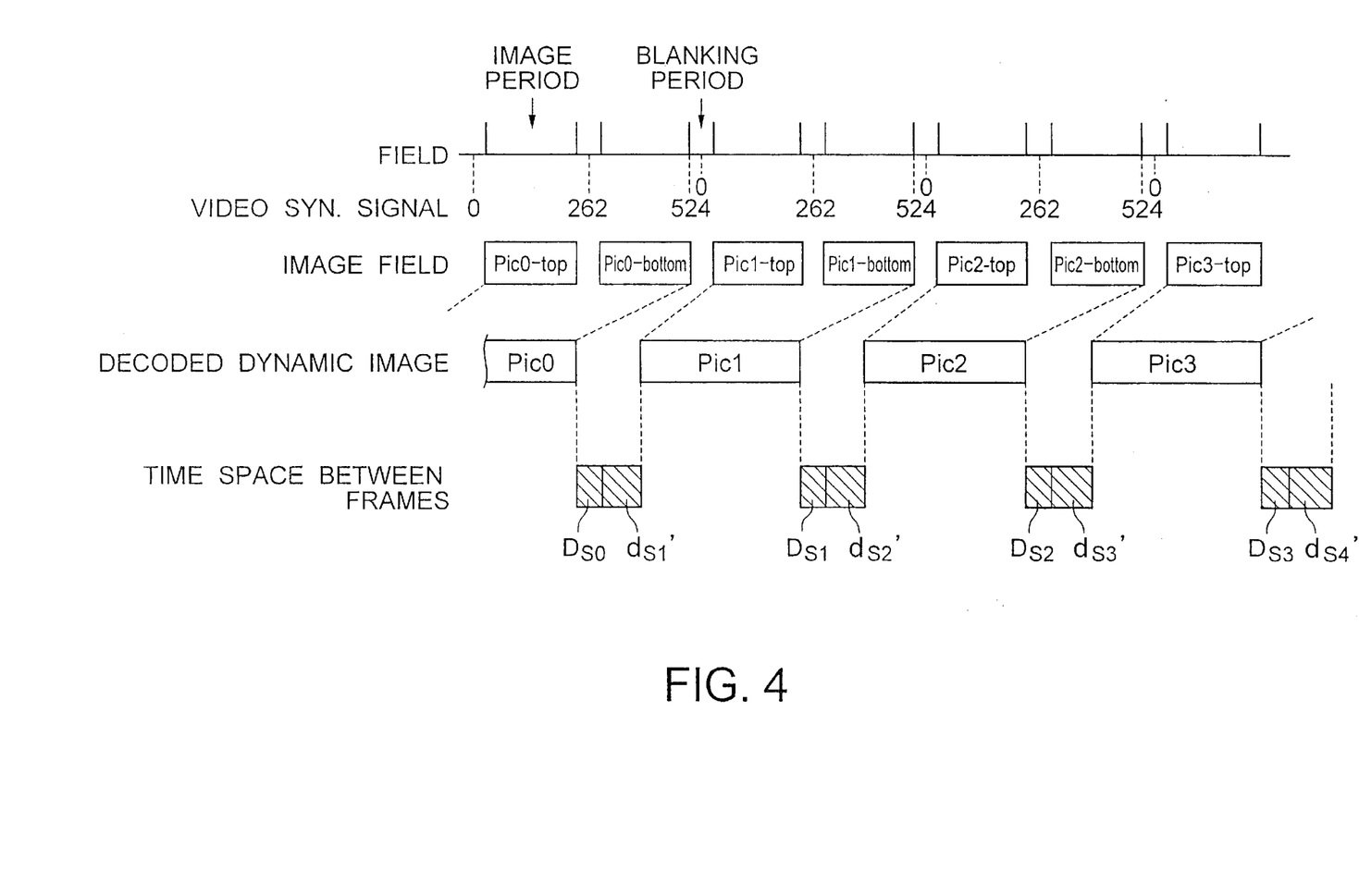
FIG. 4 is a timing chart of the image data decoder of FIG. 3.

Referring to FIG. 4 showing a timing chart in the image data decoder of FIG. 3, a blanking period is sandwiched between an odd-numbered field and an even-numbered field, the combination of which constitutes a single frame. The compressed moving picture data includes successive frame pictures pic0 to pic3, the frame pictures sandwiching an original decoding stop period (or first time space) between each two of the frame periods. Illustrated decoding stop periods are obtained by adding the time spaces ds1, ds2, ds3, ds4 . . . obtained by the above calculation for a single picture frame to the original decoding stop period Ds0, Ds1, Ds2, Ds3 . . . disposed between a frame period and a preceding frame period. The image data pic0-top, pic1-top, pic2-top, . . . for odd-numbered field and the image data pic0-bottom, pic1-bottom, pic2-bottom, . . . for the even-numbered field are output to the display unit corresponding to the decoded moving picture data pic0, pic1, pic2, . . . .

Figure 5:
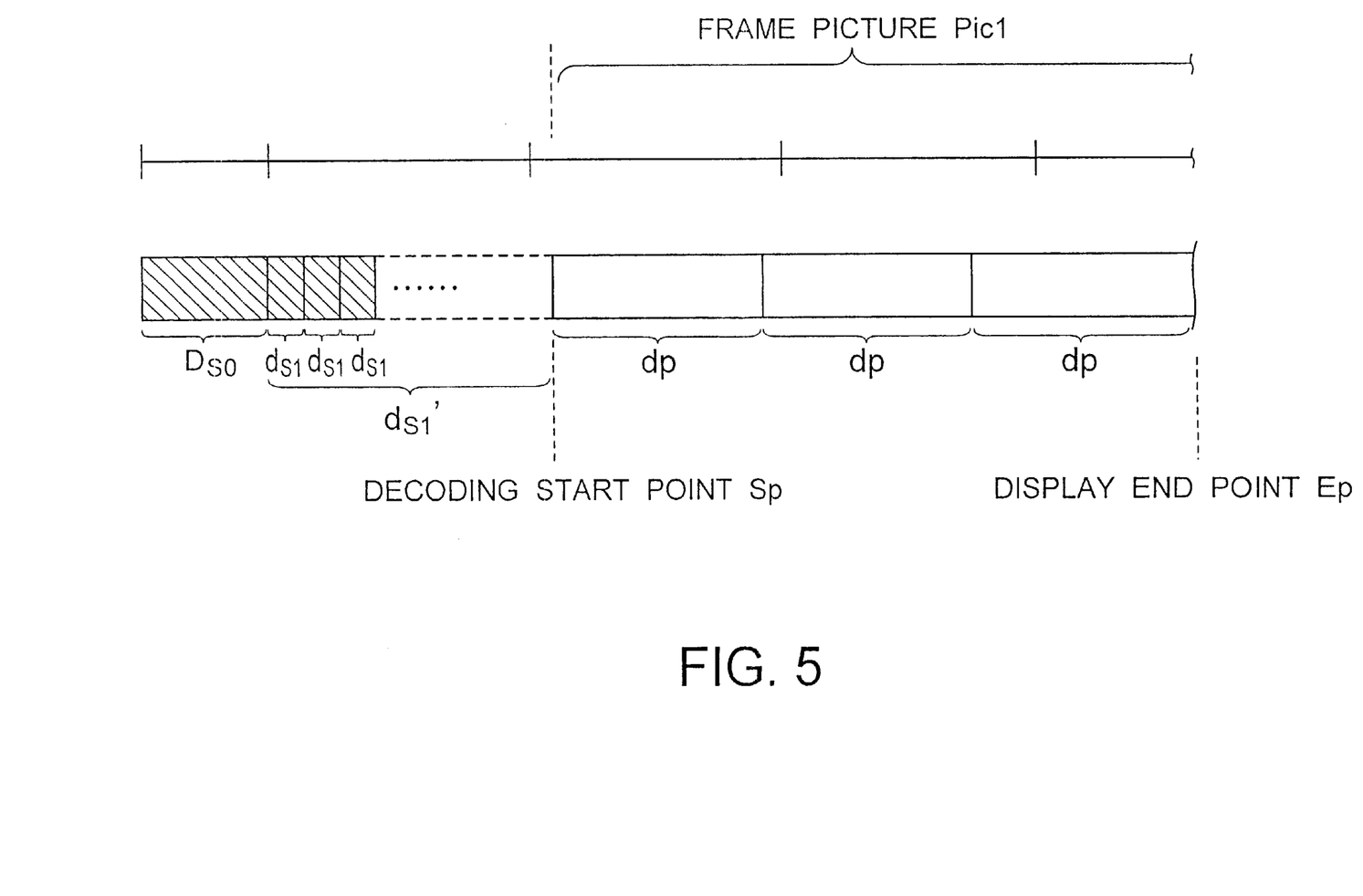
FIG. 5 is a schematic operational diagram of the image data decoder of FIG. 3.
Figure 6:
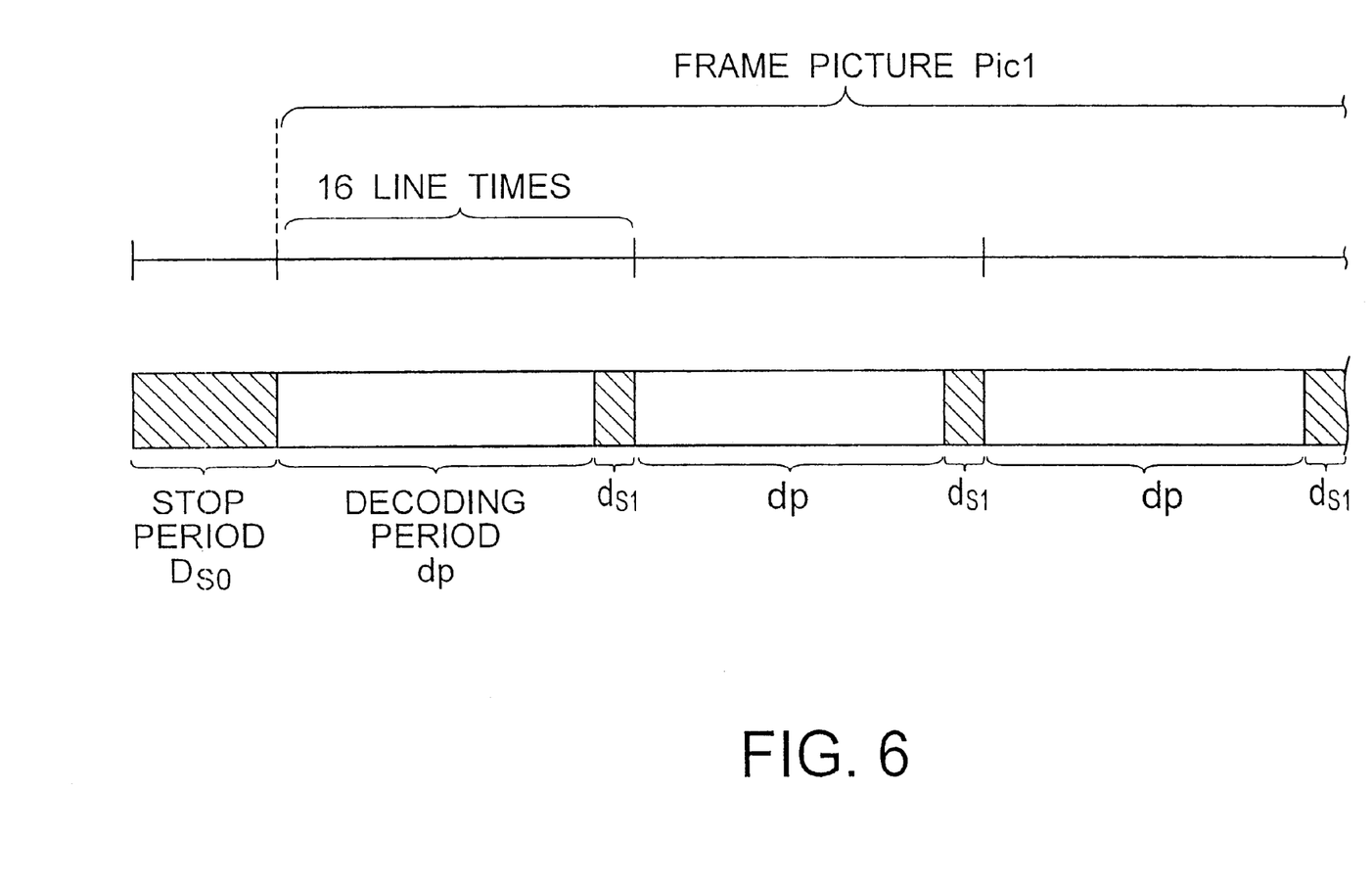
FIG. 6 is another schematic operational diagram of the image data decoder of FIG. 3.
Figure 7:
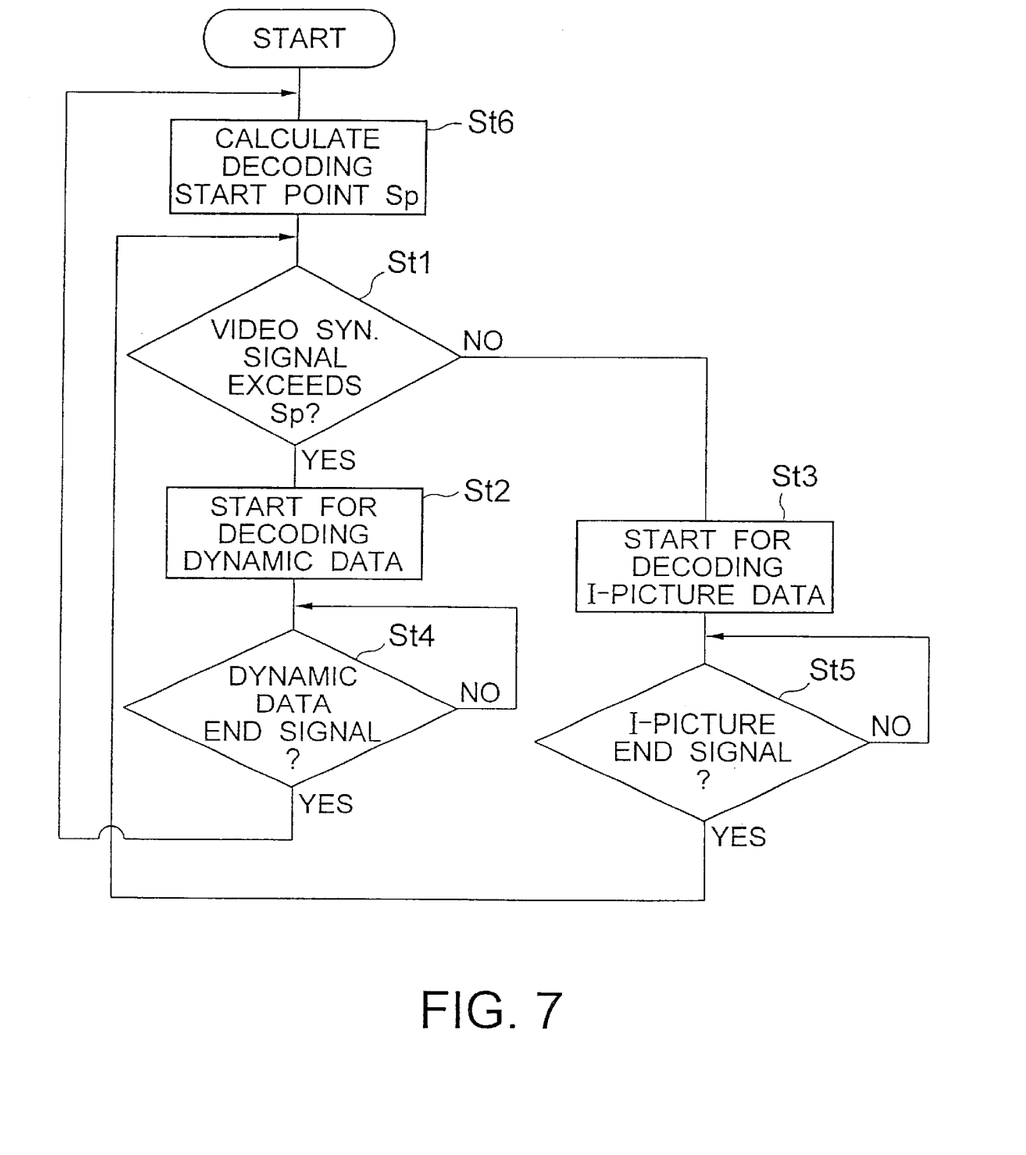
FIG. 7 is a flowchart of the operation of the image data decoder of FIG. 3.

FIG. 5 shows decoding by the moving picture decoder of FIG. 3, FIG. 6 shows decoding by a conventional moving picture decoder, and FIG. 7 shows a flowchart of the operation of the moving picture decoder of the present embodiment. Referring to these figures, operation of the moving picture decoder of the present embodiment will be more specifically described.

At the start of the decoding, the decoder control block 12 delivers a decoding start signal Si8 for indicating a start of decoding the moving picture data while receiving a multiplication factor Si12 and a display location signal Si13. The first selection section 16 in the MPEG decoder 30 receives the compressed moving picture data to deliver the same to the data processing section 18. At this moment, the first latch section 14 latches parameters of the picture frame to be decoded.

Subsequently, the period control section 21 calculates a time space sum (or second time space) ds1' by adding together a plurality of unit spaces ds1, as shown in FIG. 5, each disposed between each two of the decoding periods dp. Each of the decoding periods dp corresponds to a time length for decoding 16 lines in a single macro block line. Each unit space ds1 is smaller than the decoding stop period (first time space) Ds0 between picture frames, as illustrated in FIG. 5. Then, the display end point calculator 20 calculates the display end point Ep of the frame picture pic1 of the moving picture data by considering the multiplication factor Si12 input therein. The decoding start point calculator 19 calculates the start point Sp for decoding the picture frame pic1 of the moving picture data based on the display end point Ep and the time space sum ds1' at step St6 in FIG. 7.

After the decode start point Sp is calculated, if the video synchronizing signal indicates a number which does not exceed the display end point Ep (step St1 in FIG. 7), the period control section 21 delivers "1" for the state signal Si9 for indicating the I-picture period, and a decoding start signal Si10 for decoding the I-picture data (step St3 in FIG. 7). Thus, the first selection section 16 receives the compressed I-picture data Si2 and delivers the same to the data processing section 18. The data processing section 18 decodes the compressed I-picture data within the time space obtained by adding the time space sum ds1' to the decoding stop period Ds0 between the picture frames, and delivers the decoded I-picture data to the buffer 13. The MPEG decoder 11 delivers an end notification signal Si7 to the decoder control block 12 for notifying the end of decoding the I-picture data after the decoding of a single slice of the I-picture data is finished.

After the notifying signal Si7 for notifying the end of decoding the I-picture data is delivered at step St5, the period control section 21 again compares the present number of the video synchronizing signal against the decoding start point at step St1. If the number does not exceed the decoding start point, the steps St3 and St5 as described above are iterated. On the other hand, if the number of the synchronizing signal exceeded the decoding start point at step St1, the period control section 21 delivers "0" for the state signal Si9 to the decoder control block 11 for indicating the MPEG period, and a decoding start signal Si8 for decoding the moving picture data at step St2. Thus, the first selection section 16 receives the compressed moving picture data and delivers the same to the data processing section 18. The data processing section 18 decodes the moving picture data from the decoding start point Sp for a plurality of decoding periods dp in the frame picture pic1 of the moving picture data Si1, without a time space ds1 disposed therebetween. The decoded moving picture data is output to the buffer 13. The MPEG decoder 11 delivers an end notification signal Si6 to the decoder control block 12 for notifying the end of decoding the moving picture data.

After the end notification signal Si6 is delivered at step St4, the decoder control block 12 again calculates the decoding start point for the moving picture data, iterating the above steps. By iterating these steps, the moving picture decoder of the present embodiment decodes the moving picture data Si1 and the I-picture data Si2 alternately with each other, thereby enabling the display unit to display the I-picture image together with the moving picture on the same screen.

In the present embodiment, a still picture defined by the I-picture data in a MPEG standard can be displayed on a screen together with the moving picture data, by decoding an amount of several slices or several macro block lines of the I-picture data within a single decoding stop period for the moving picture data. In addition, by switching between the parameters of the layers above the picture layer of the moving picture data and the parameters of the layers above the slice or macro block line layer of the I-picture data, both the moving picture data and the I-picture data can be decoded by a common decoder, which reduces the circuit scale for the decoder.

Figure 8:
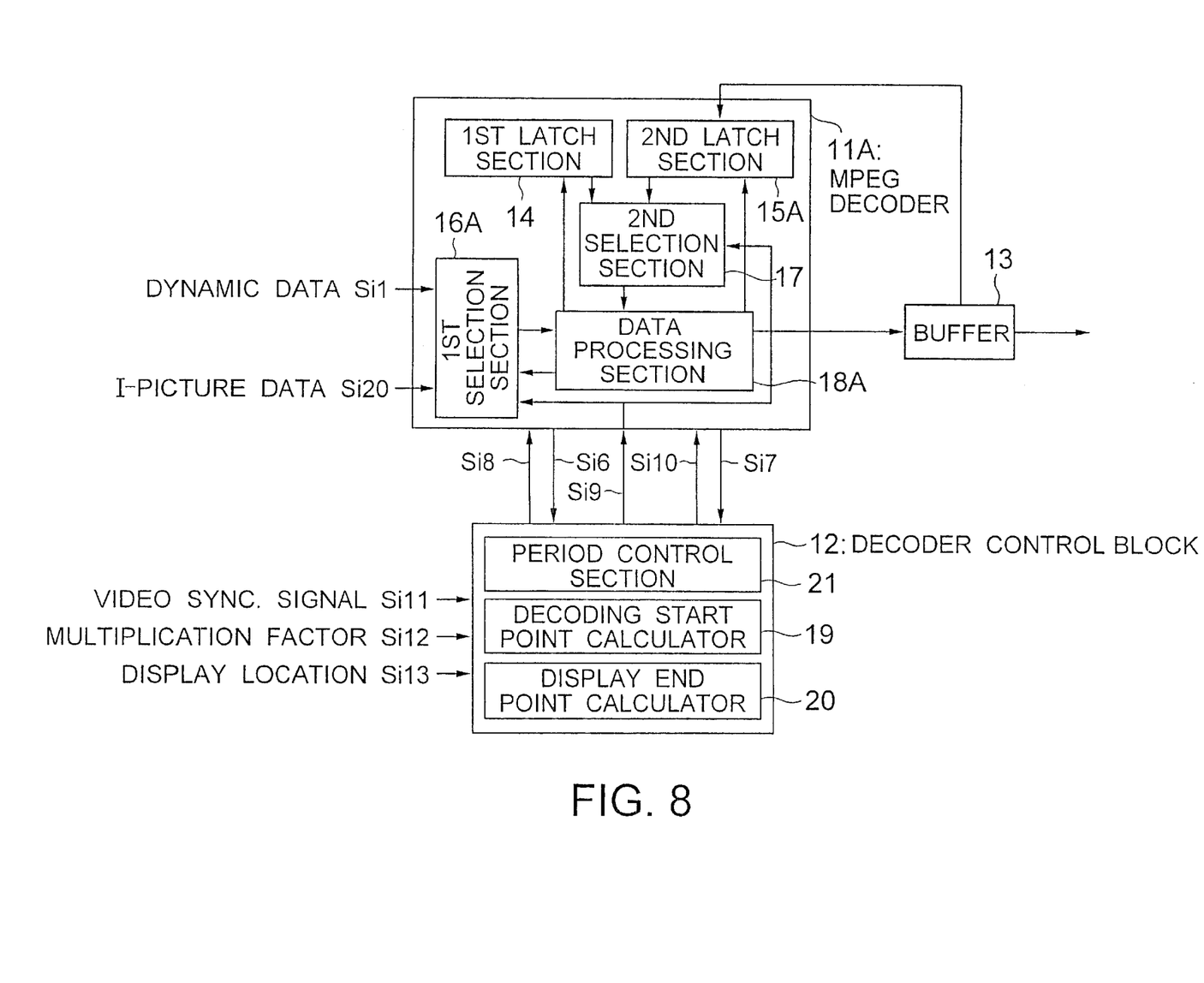
FIG. 8 is a block diagram of an image data decoder according to a second embodiment of the present invention.

Referring to FIG. 8, an image data decoder according to a second embodiment of the present invention is similar to the first embodiment except for the configuration of the MPEG decoder 11A of the present embodiment, which decodes compressed JPEG image data and compressed moving picture data alternately with each other. The compressed JPEG image data is referred to as still picture data compressed based on "Joint Photographic Express Group" in an international standard for encoding a still color picture signal.

The MPEG decoder 11A in the image data decoder of the present embodiment includes a first latch section 14 similar to the first embodiment, a second latch section 15A, a first selection section 16A, a second selection section 17 similar to the first embodiment, and a data processing section 18A.

The second latch section 15A latches parameters attached to the layers above the frame layer among the parameters attached to all the layers of the compressed JPEG image data input to the image data decoder. In this configuration, the second latch section 15A latches data of the layers above the frame layer, thereby decoding the compressed JPEG image data scan by scan within a time interval between the decoding of the moving picture data. The first selection section 16A selects either the compressed moving picture data Si1 or the compressed JPEG image data Si20 and delivers the selected data to the data processing section 18A.

The data processing section 18A forwards specified parameters in the compressed moving picture data Si1 to the first latch section 14, and forwards specified parameters in the compressed JPEG image data Si20 to the second latch section 15A. The data processing section 18A decodes the compressed moving picture data Si1 supplied from the first selection section 14 within the decoding period dp such as shown in FIG. 5 determined by the period control section 21. The data processing section 18A also decodes the compressed JPEG image data Si20 within the decoding stop period for the moving picture data obtained by adding the time spaces in a single picture frame of the moving picture data to the decode stop period between the picture frames.

The period control section 21 calculates the time length required for processing a specified number of lines in a frame picture, thereby estimating the time space in the frame picture, and controls the data processing section 18A to decode the frame picture from the decoding start point calculated by the decoding start point calculator 19. The display end point calculator 20 calculates the display end point Ep of the frame picture, whereas the decoding start point calculator 19 calculates the decoding start point for the frame picture based on the display end point Ep and the time space ds1'.

The image data decoder of the present embodiment decodes the compressed MPEG image data Si1 and the compressed JPEG image data Si20 alternately with each other, thereby enabling a display unit to display a moving picture and a still picture on the same screen. Accordingly, a reverse DCT processor as used in the MPEG decoder can be used for processing the JPEG image data. This allows provision of the reverse DCT processor unnecessary, and thus the MPEG image decoder of the present embodiment having a circuit scale similar to the conventional MPEG image decoder can decode the MPEG image data and the JPEG image data.

Since the above embodiments are described only for examples, the present invention is not limited to the above embodiments and various modifications or alterations can be easily made therefrom by those skilled in the art without departing from the scope of the present invention.

What is claimed is:

1. An image data decoder comprising:

a decoding block including a data processing section for decoding moving picture data and still picture data alternately with each other, the moving picture data including a plurality of frame pictures each having a frame period, each adjacent two of the frame pictures being supplied with a first time space therebetween: and a decoder control block including a calculation section for calculating a first time length necessary for said decoding block to decode data for each of the frame pictures and calculating a second time space by subtracting the first time length from the frame period, and a control section for controlling said decoding block to decode the moving picture data for the first time length and to decode the still picture data for a sum of the first time space and the second time space.

2. The image data decoder as defined in claim 1, wherein said calculating section calculates a display end point of one of the frame pictures, and calculates a decoding start point based on the display end point and the second time space.

3. The image data decoder as defined in claim 1, wherein said decoding block further comprises a first selection section for selecting the moving picture data or the still picture data, the moving picture data being compressed data, the still picture data being compressed I-picture data of MPEG standard.

4. The image data decoder as defined in claim 3, wherein said decoding block further comprises a first latch section for latching specified parameters in the moving picture data, a second latch section for latching specified parameters in the I-picture data, and a second selection section for selecting data latched by said first latch section or data latched by said second latch section to be input to said data processing section.

5. The image data decoder as defined in claim 1, wherein the still picture data includes I-picture of MPEG standard, and said data processing section decodes a plurality of slices or macro block lines of the I-picture in the sum of the first time space and the second time space.

6. The image data decoder as defined in claim 1, wherein said decoding block further comprises a first selection section for selecting the moving picture data or the still picture data, the moving picture data being compressed data, the still picture data being compressed data of JPEG standard.

7. The image data decoder as defined in claim 6, wherein said decoding block further comprises a first latch section for latching specified parameters in the moving picture data, a second latch section for latching specified parameters in the data of JPEG standard, and a second selection section for selecting data latched by said first latch section or data latched by said second latch section to be input to said data processing section.

* * * * *